(12) United States Patent
Huang et al.

(10) Patent No.: US 7,599,178 B2
(45) Date of Patent: Oct. 6, 2009

(54) CONNECTION ASSEMBLY FOR CONNECTING BODIES, AND PORTABLE ELECTRONIC APPARATUS AND BASE USING THE SAME

(75) Inventors: Wen-Yi Huang, Taipei (TW); Po-An Lin, Taipei (TW); Kang-Yeh Yu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 254 days.

(21) Appl. No.: 11/691,503

(22) Filed: Mar. 27, 2007

(65) Prior Publication Data

US 2008/0024966 A1  Jan. 31, 2008

(30) Foreign Application Priority Data

Jul. 26, 2006 (TW) .............................. 95127245 A

(51) Int. Cl.
*G06F 1/16* (2006.01)
(52) U.S. Cl. .............................. 361/679.43; 361/679.28; 361/679.29; 361/679.58
(58) Field of Classification Search ......... 361/679–683, 361/686; 312/223.1, 223.2, 236; 248/917–923; 710/303, 304
See application file for complete search history.

(56) References Cited

U.S. PATENT DOCUMENTS

| | | | | |
|---|---|---|---|---|
| 5,241,303 A | * | 8/1993 | Register et al. | 345/168 |
| 5,600,580 A | * | 2/1997 | Honjo et al. | 361/681 |
| 5,619,397 A | * | 4/1997 | Honda et al. | 361/686 |
| 6,788,527 B2 | | 9/2004 | Doczy et al. | |
| 6,944,012 B2 | | 9/2005 | Doczy et al. | |
| 6,989,987 B1 | * | 1/2006 | Wilson et al. | 361/681 |
| 7,068,496 B2 | * | 6/2006 | Wong et al. | 361/681 |
| 7,123,476 B2 | * | 10/2006 | Ke | 361/686 |
| 2004/0052036 A1 | * | 3/2004 | DeLuga | 361/679 |
| 2004/0227045 A1 | * | 11/2004 | An et al. | 248/278.1 |
| 2005/0111182 A1 | * | 5/2005 | Lin et al. | 361/686 |
| 2006/0256511 A1 | * | 11/2006 | Ma | 361/680 |
| 2008/0055844 A1 | * | 3/2008 | Kobayashi et al. | 361/686 |

* cited by examiner

*Primary Examiner*—Jayprakash N Gandhi
*Assistant Examiner*—Anthony Q Edwards
(74) *Attorney, Agent, or Firm*—Jianq Chyun IP Office

(57) ABSTRACT

A connection assembly, which is suitable to connect a first body of a portable electronic apparatus with a second body thereof, is provided. The connection assembly includes a positioning unit, first electrical connectors and a second electrical connector. The positioning unit is rotatably connected to the first body and removably connected to the second body. The first electrical connectors are connected to the positioning unit, and the second electrical connector is connected to the second body so as to connect to one of the first electrical connectors. Therefore, the connection assembly occupies only a little area of surfaces of the two bodies.

21 Claims, 8 Drawing Sheets

CONNECTION ASSEMBLY FOR CONNECTING BODIES, AND PORTABLE ELECTRONIC APPARATUS AND BASE USING THE SAME

CROSS-REFERENCE TO RELATED APPLICATION

This application claims the priority benefit of Taiwan application serial no. 95127245, filed Jul. 26, 2006. All disclosure of the Taiwan application is incorporated herein by reference.

BACKGROUND OF THE INVENTION

1. Field of the Invention

The present invention relates to an electronic apparatus, and more particularly to a portable electronic apparatus and a connection assembly between two separate bodies of the portable electronic apparatus.

2. Description of Related Art

Currently, in the era of information explosion, electronic products have become indispensable in daily life. As the continuous progress of the electronic technology, electronic products with humanization designs and preferred functions are bringing out the new products all the time.

As for the development and application of personal computers, desktop personal computers (desktop PCs) are firstly developed, but the desktop PCs have the defects of being heavy and inconvenient for being taken along. Thus, notebook PCs appear, and as the development of the technology, tablet PCs are also developed.

The tablet PC is convenient in usage, which can be manipulated in the arm, on the desk or on the lap by using a stylus, without using the equipment such as a keyboard or a mouse. However, when additional functions are required, the user can mount the tablet PC on a docking station. The docking station can be allocated with a keyboard, and externally connected with a mouse, so that the tablet PC can be manipulated through the keyboard and the mouse. Moreover, the docking station further includes an optical disc drive, a hard disc drive, a battery, etc., so as to provide other functions besides inputting through pressing keyboards and cursor control.

With reference to U.S. Pat. Nos. 6,788,527 and 6,944,012, both entitled "Tablet Computer Keyboard and System and Method Incorporating Same", a tablet computer keyboard is disclosed, in which a rotatable disk mechanism is disposed on the keyboard, which is used for rotating the tablet PC mounted thereon, so as to have different usage aspects. However, the rotatable disk mechanism occupies an excessive large area on the surface of the keyboard, thus causing a difficulty in the periphery designs.

SUMMARY OF THE INVENTION

In view of the above, the present invention is directed to a connection assembly, which is used to connect two separate bodies of a portable electronic apparatus, and occupies only a little area of surfaces of the two bodies.

The present invention is also directed to a base of a portable electronic apparatus, in which a connection assembly occupies only a little area of surfaces of the base.

The present invention is also directed to a portable electronic apparatus, in which a connection assembly occupies only a little area of surfaces of the two separate bodies.

As embodied and broadly described herein, the present invention provides a connection assembly, which is suitable to connect a first body of a portable electronic apparatus with a second body thereof. The connection assembly includes a positioning unit, first electrical connectors, and a second electrical connector. The positioning unit is rotatably connected to the first body and removably connected to the second body. The first electrical connectors are connected to the positioning unit, and the second electrical connector is connected to the second body so as to connect to one of the first electrical connectors.

In one embodiment of the present invention, the connection assembly further includes a hinge disposed between the positioning unit and the first body, such that the positioning unit is rotatably connected to the first body through the hinge.

In one embodiment of the present invention, the positioning unit of the connection assembly is rotatably connected to one side of the first body, and removably connected to one side of the second body.

In one embodiment of the present invention, the positioning unit of the connection assembly includes a frame, a latch, a first buckling portion, and a second buckling portion. The frame is rotatably connected to the first body, and the latch is movably disposed in the frame. The first buckling portion is connected to the latch, and the second buckling portion is connected to the second body. When the latch is located at a first position relative to the frame, the second buckling portion and the first buckling portion are buckled with each other, and when the latch is located at a second position relative to the frame, the second buckling portion and the first buckling portion are not buckled with each other.

In one embodiment of the present invention, one of the first buckling portion and the second buckling portion of the connection assembly is a hook, and the other is a slot.

In one embodiment of the present invention, the positioning unit of the connection assembly further includes a recovering component, disposed between the latch and the frame, for exerting a force to drive the latch to move to the first position relative to the frame.

In one embodiment of the present invention, the latch of the connection assembly has a release key that is forced to drive the latch to move to the second position.

As embodied and broadly described herein, the present invention further provides a base of a portable electronic apparatus, which includes a first body and a connection assembly. The connection assembly includes a positioning unit, first electrical connectors, and a second electrical connector. The positioning unit is rotatably connected to the first body and removably connected to the second body of the portable electronic apparatus. The first electrical connectors are connected to the positioning unit, and the second electrical connector is connected to the second body so as to connect to one of the first electrical connectors.

In one embodiment of the present invention, the connection assembly of the above base further includes a hinge disposed between the positioning unit and the first body, such that the positioning unit is rotatably connected to the first body through the hinge.

In one embodiment of the present invention, the positioning unit of the above base is rotatably connected to one side of the first body, and removably connected to one side of the second body.

In one embodiment of the present invention, the positioning unit of the above base includes a frame, a latch, a first buckling portion, and a second buckling portion. The frame is rotatably connected to the first body, and the latch is movably disposed in the frame. The first buckling portion is connected to the latch, and the second buckling portion is connected to the second body. When the latch is located at a first position relative to the frame, the second buckling portion and the first buckling portion are buckled with each other, and when the latch is located at a second position relative to the frame, the second buckling portion and the first buckling portion are not buckled with each other.

In one embodiment of the present invention, one of the first buckling portion and the second buckling portion of the above base is a hook, and the other is a slot.

In one embodiment of the present invention, the positioning unit of the above base further includes a recovering component disposed between the latch and the frame, for exerting a force to drive the latch to move to the second position relative to the frame.

In one embodiment of the present invention, the latch of the above base has a release key that is forced to drive the latch to move to the second position.

In one embodiment of the present invention, the first body of the above base is a computer docking station or a computer system base.

As embodied and broadly described herein, the present invention further provides a portable electronic apparatus, which includes a first body, a second body, and a connection assembly. The connection assembly includes a positioning unit, first electrical connectors, and a second electrical connector. The positioning unit is rotatably connected to the first body and removably connected to the second body. The first electrical connectors are connected to the positioning unit, and the second electrical connector is connected to the second body. When the second body is connected to the position unit in a first connection state, the second electronic connector is connected to one of the first electrical connectors. When the second body is connected to the position unit in a second connection state opposite to the first connection state, the second electrical connector is connected to the other one of the first electrical connectors.

In one embodiment of the present invention, the connection assembly of the above the portable electronic apparatus further includes a hinge disposed between the positioning unit and the first body, such that the positioning unit is rotatably connected to the first body through the hinge.

In one embodiment of the present invention, the positioning unit of the above portable electronic apparatus is rotatably connected to one side of the first body, and removably connected to one side of the second body.

In one embodiment of the present invention, the positioning unit of the above portable electronic apparatus includes a frame, a latch, a first buckling portion, and a second buckling portion. The frame is rotatably connected to the first body, and the latch is movably disposed in the frame. The first buckling portion is connected to the latch, and the second buckling portion is connected to the second body. When the latch is located at a first position relative to the frame, the second buckling portion and the first buckling portion are buckled with each other, and when the latch is located at a second position relative to the frame, the second buckling portion and the first buckling portion are not buckled with each other.

In one embodiment of the present invention, one of the first buckling portion and the second buckling portion of the above portable electronic apparatus is a hook, and the other is a slot.

In one embodiment of the present invention, the positioning unit of the above portable electronic apparatus further includes a recovering component disposed between the latch and the frame, for exerting a force to drive the latch to move to the first position relative to the frame.

In one embodiment of the present invention, the latch of the above portable electronic apparatus has a release key that is forced to drive the latch to move to the second position.

In one embodiment of the present invention, the first body of the above portable electronic apparatus is a computer docking station, and the second body is a tablet PC.

In one embodiment of the present invention, the first body of the above portable electronic apparatus is a computer system base, and the second body is a display.

Compared with the rotatable disk mechanism of the conventional tablet PC, the connection assembly of the present invention occupies less area on the surface of the first body, and thus, a relatively large area on the surface of the first body can be used for disposing the peripheral devices, so as to reduce the limits on the peripheral design of the docking station of the conventional tablet PC.

In order to make the aforementioned and other objectives, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
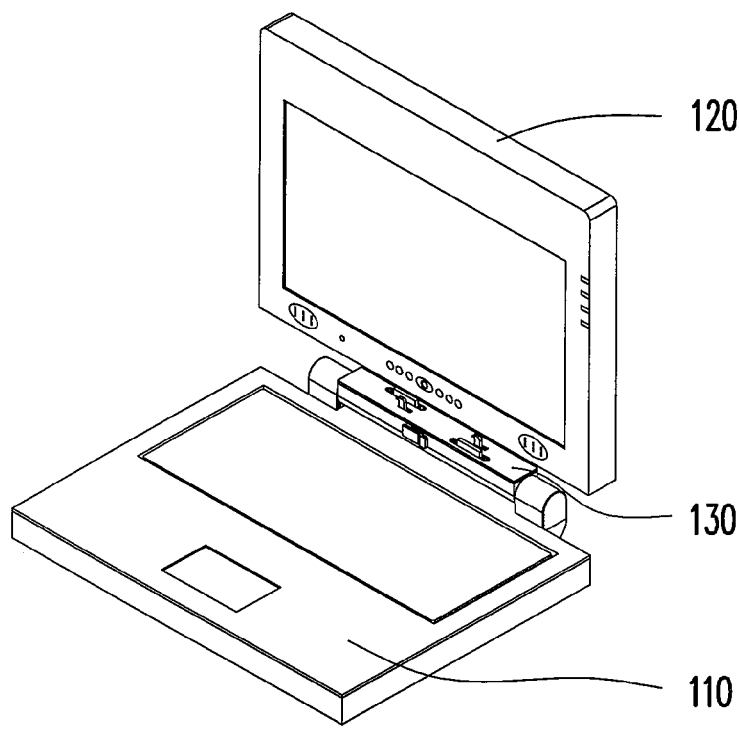
FIG. 1A is a perspective view of a portable electronic apparatus according to an embodiment of the present invention before two bodies are assembled in a connection state.
Figure 2A:
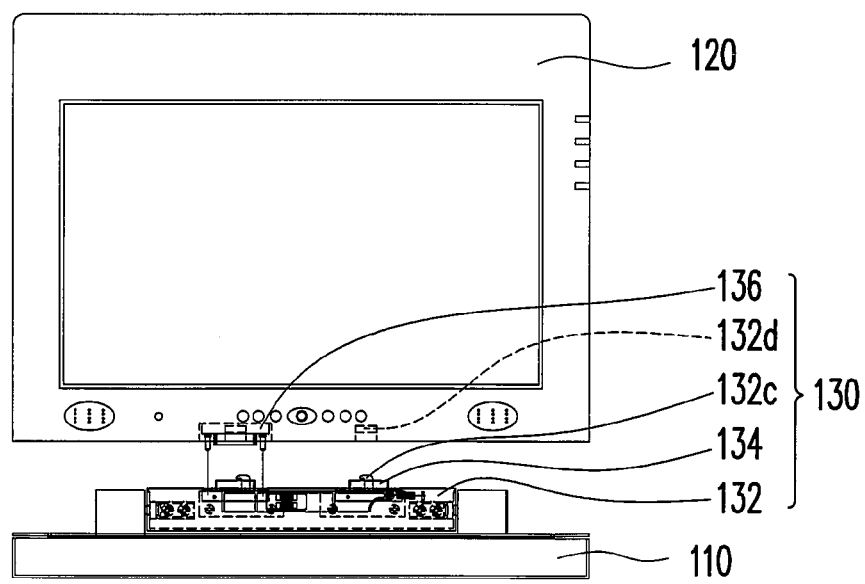
FIG. 2A is a side view of the portable electronic apparatus of FIG. 1A.
Figure 1B:
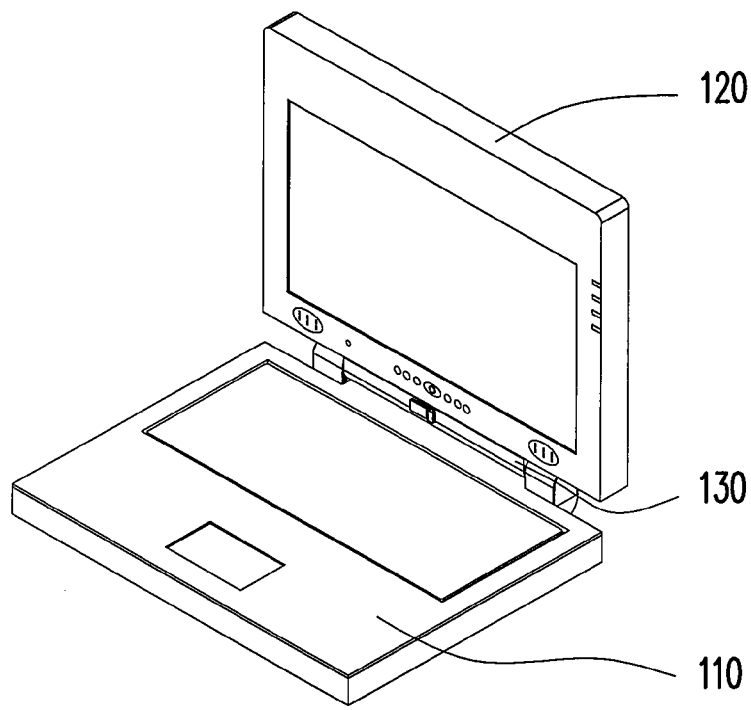
FIG. 1B is a perspective view of the portable electronic apparatus of FIG. 1A after the two bodies are assembled in a connection state.
Figure 2B:
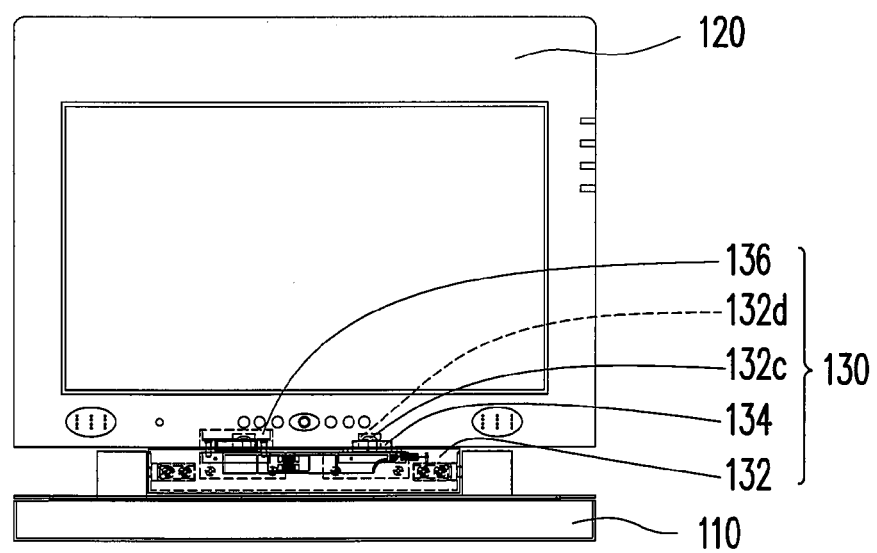
FIG. 2B is a side view of the portable electronic apparatus of FIG. 1B.

FIG. 1A is a perspective view of a portable electronic apparatus according to an embodiment of the present invention before two bodies are assembled in a connection state, FIG. 1B is a perspective view of the portable electronic apparatus of FIG. 1A after the two bodies are assembled in a connection state, FIG. 2A is a side view of the portable electronic apparatus of FIG. 1A, and FIG. 2B is a side view of the portable electronic apparatus of FIG. 1B.

Referring to FIGS. 1A, 1B, 2A, and 2B firstly, a portable electronic apparatus 100 according to an embodiment of the present invention includes a first body 110, a second body 120, and a connection assembly 130. The first body 110 and the second body 120 are, for example, a computer docking station and a tablet computer respectively, or for example, a computer system base and a display respectively. When the first body 110 and the second body 120 are respectively a computer docking station and a tablet computer, the second body 120 is separated form the first body 110 (as shown in FIGS. 1A and 2A), which is convenient for the user to take along, and the user can only take along with the second body 120, and may operate the second body 120 through a stylus (not shown).

If additional functions are required, the second body 120 is assembled with the first body 110 through the connection assembly 130 (as shown in FIGS. 1B and 2B). The first body 110 may have a keyboard module, and the user can input text or instructions through the keyboard module.

Figure 1C:
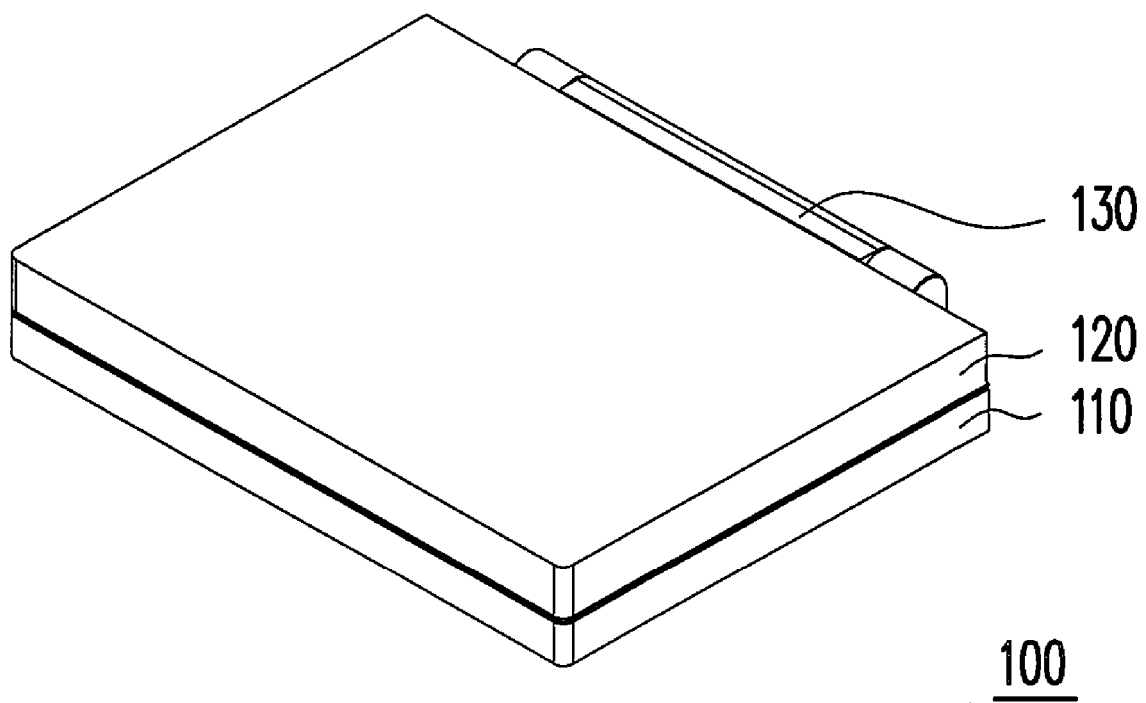
FIG. 1C is a perspective view of the portable electronic apparatus of FIG. 1B after the two bodies are assembled in a connection state and closed.

FIG. 1C is a perspective view of the portable electronic apparatus of FIG. 1B after the two bodies are assembled in a connection state and closed. Referring to FIG. 1C, the first body 110 and the second body 120 are closed relative to each other, such that the display region of the second body 120 is protected from being damaged by an external force when being carried.

Figure 3A:
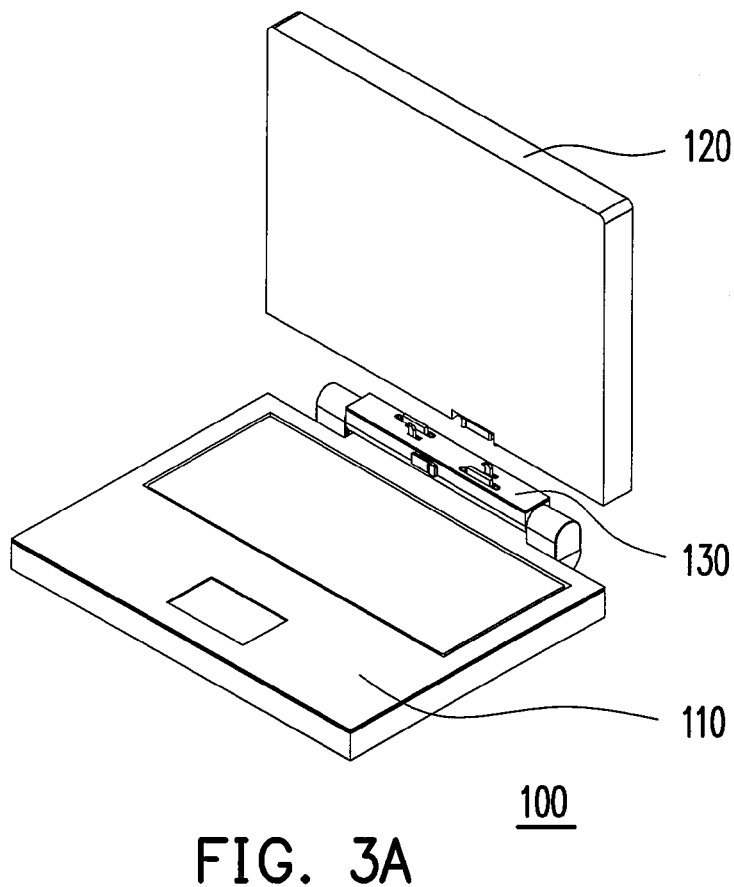
FIG. 3A is a perspective view of the portable electronic apparatus of FIG. 1A before the two bodies are assembled in another connection state.
Figure 4A:
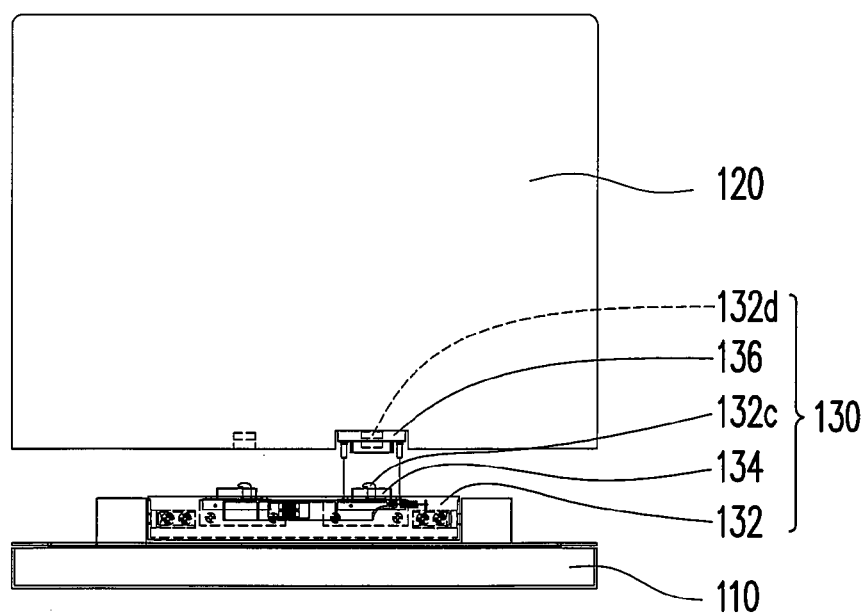
FIG. 4A is a side view of the portable electronic apparatus of FIG. 3A.
Figure 3B:
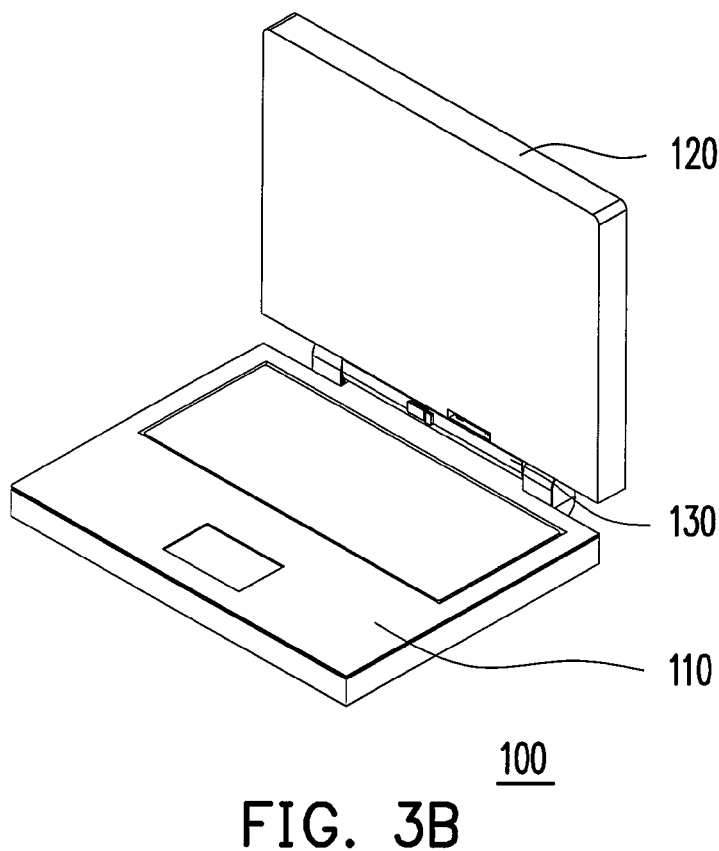
FIG. 3B is a perspective view of the portable electronic apparatus of FIG. 3A after the two bodies are assembled in another connection state.
Figure 4B:
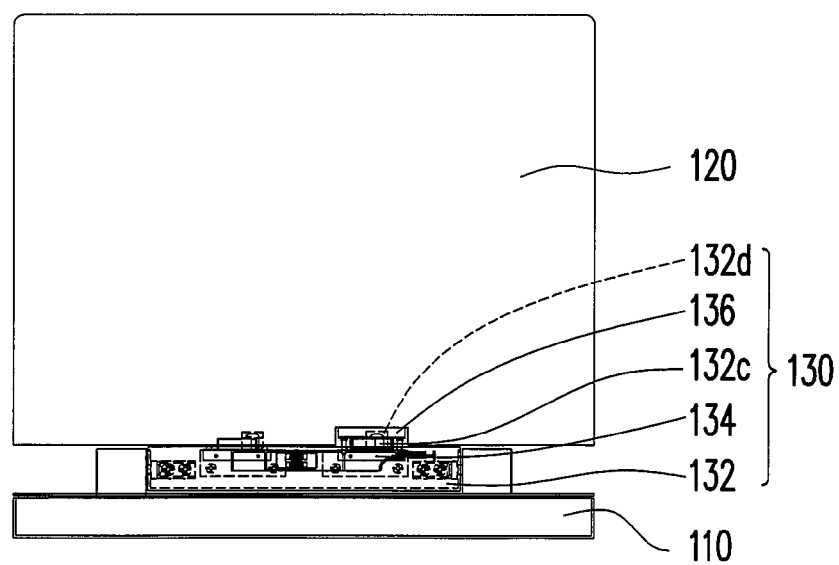
FIG. 4B is a side view of the portable electronic apparatus of FIG. 3B.

FIG. 3A is a perspective view of the portable electronic apparatus of FIG. 1A before the two bodies are assembled in another connection state, FIG. 3B is a perspective view of the portable electronic apparatus of FIG. 3A after the two bodies are assembled in another connection state, FIG. 4A is a side view of the portable electronic apparatus of FIG. 3A, and FIG. 4B is a side view of the portable electronic apparatus of is FIG. 3B.

Referring to FIGS. 2A, 2B, 4A, and 4B firstly, the connection assembly 130 includes a positioning unit 132, first electrical connectors 134, and a second electrical connector 136. The positioning unit 132 is rotatably connected to the first body 110 and removably connected to the second body 120. Particularly, the positioning unit 132 is connected to one side of the first body 110 and one side of the second body 120. The first electrical connectors 134 are connected to the positioning unit 132, and the second electrical connector 136 is connected to the second body 120.

Figure 3C:
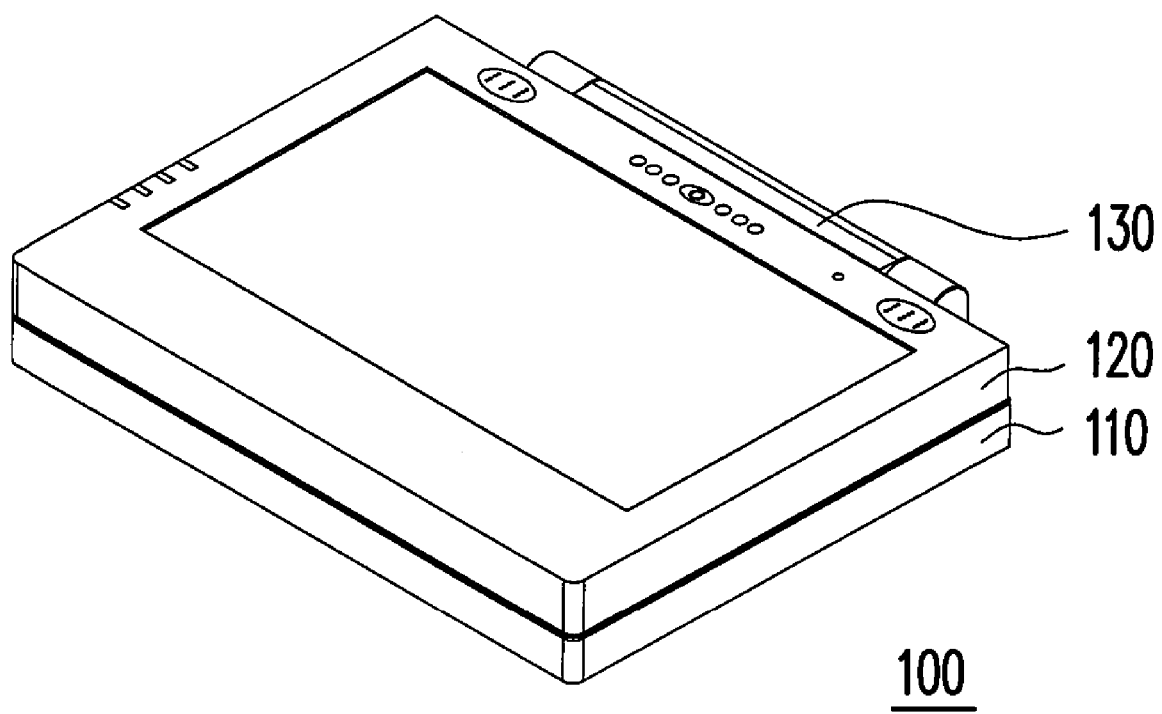
FIG. 3C is a perspective view of the portable electronic apparatus of FIG. 3B after the two bodies are assembled in a connection state and closed.

FIG. 3C is a perspective view of FIG. 3B after the two bodies are assembled in another connection state and closed. Being different from FIG. 1C, the screen of the second body 120 in FIG. 3C faces outside, so as to provide the user with a mode as using the tablet computer.

Through the rotation of the positioning unit 132, an included angle between the second body 120 and the first body 110 that are connected to the positioning unit 132 varies, e.g., rotating from the state of FIG. 1B to the state of FIG. 1C, or rotating form the state of FIG. 3B to the state of FIG. 3C.

When the second body 120 is connected to the first body 110 through the positioning unit 132 in a first connection state (as shown in FIGS. 1B and 2B), the second electrical connector 136 is connected to one of the first electrical connectors 134 (the first electrical connector 134 on the left side of FIG. 2A). When the second body 120 is connected to the first body 110 through the positioning unit 132 in a second connection state opposite to the first connection state (as shown in FIGS. 3B, 3C, and 4B), the second electrical connector 136 is connected to the other one of the first electrical connectors 134 (the first electrical connector 134 on the right side of FIG. 4A).

In the first connection state as shown in FIG. 1B, the portable electronic apparatus 100 can be used as a common notebook computer, and in the second connection state as shown in FIG. 3C, the portable electronic apparatus 100 can be used as a tablet computer.

Although the portable electronic apparatus 100 of the present invention does not have the conventional rotatable disk mechanism for rotating the tablet computer mounted thereon on the keyboard to achieve different usage aspects, but the second body 120 and the first body 110 at least have the above first and second connection states, which are sufficient for the user to achieve the convenience and versatility in usage.

Therefore, the present invention adopts the connection assembly 130 to replace the conventional rotatable disk mechanism, such that not only the convenience and versatility in usage are still remained, but also less surface area of the body is occupied, and thus, the additional surface area of the body can be used for disposing peripheral components, so as to reduce the limit on the peripheral design of the conventional tablet computer. The detailed structure and operation process of the connection assembly 130 are further described below.

Figure 5A:
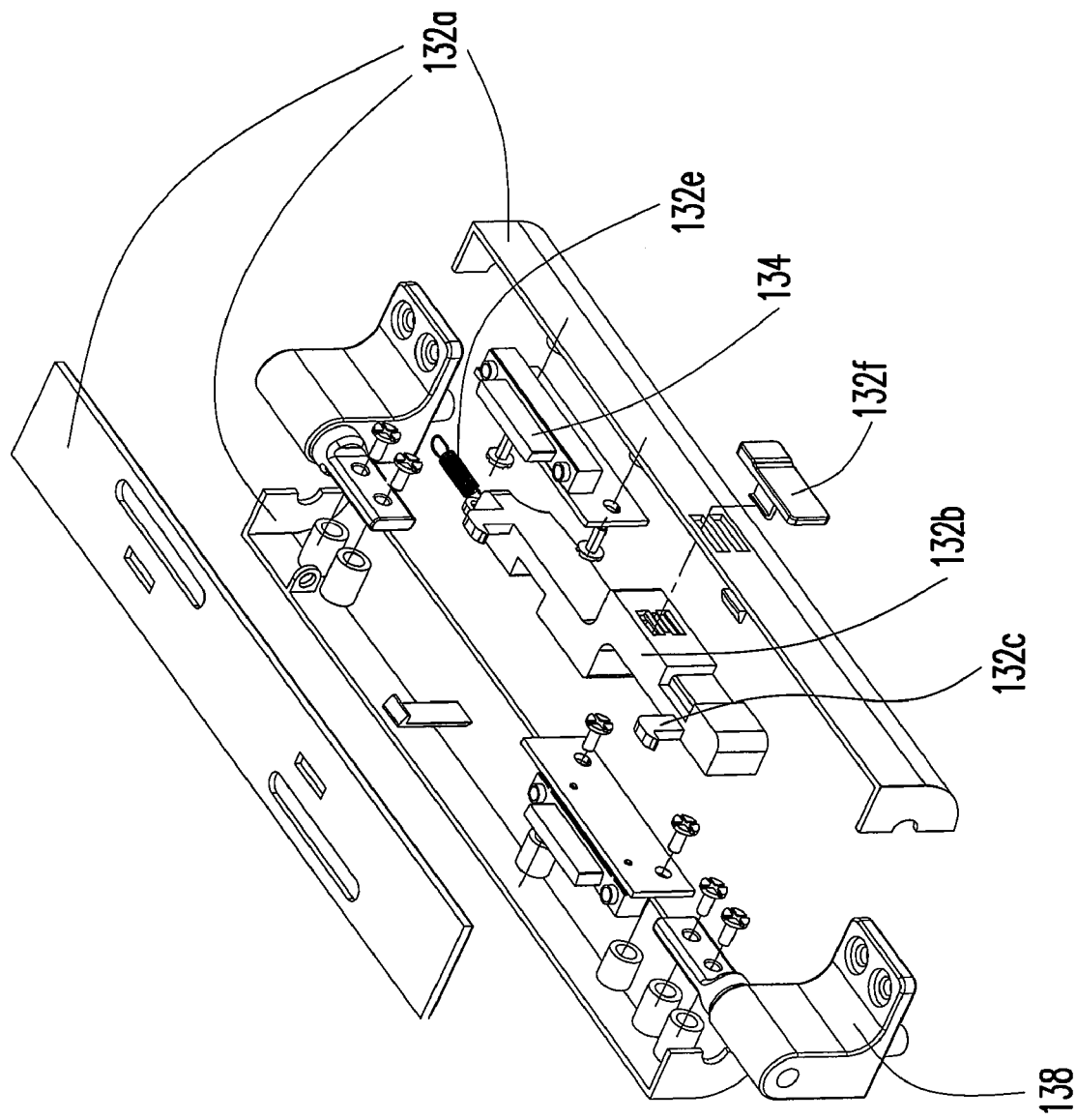
FIG. 5A is an exploded view of a part of the connection assembly disposed on the first body.
Figure 5B:
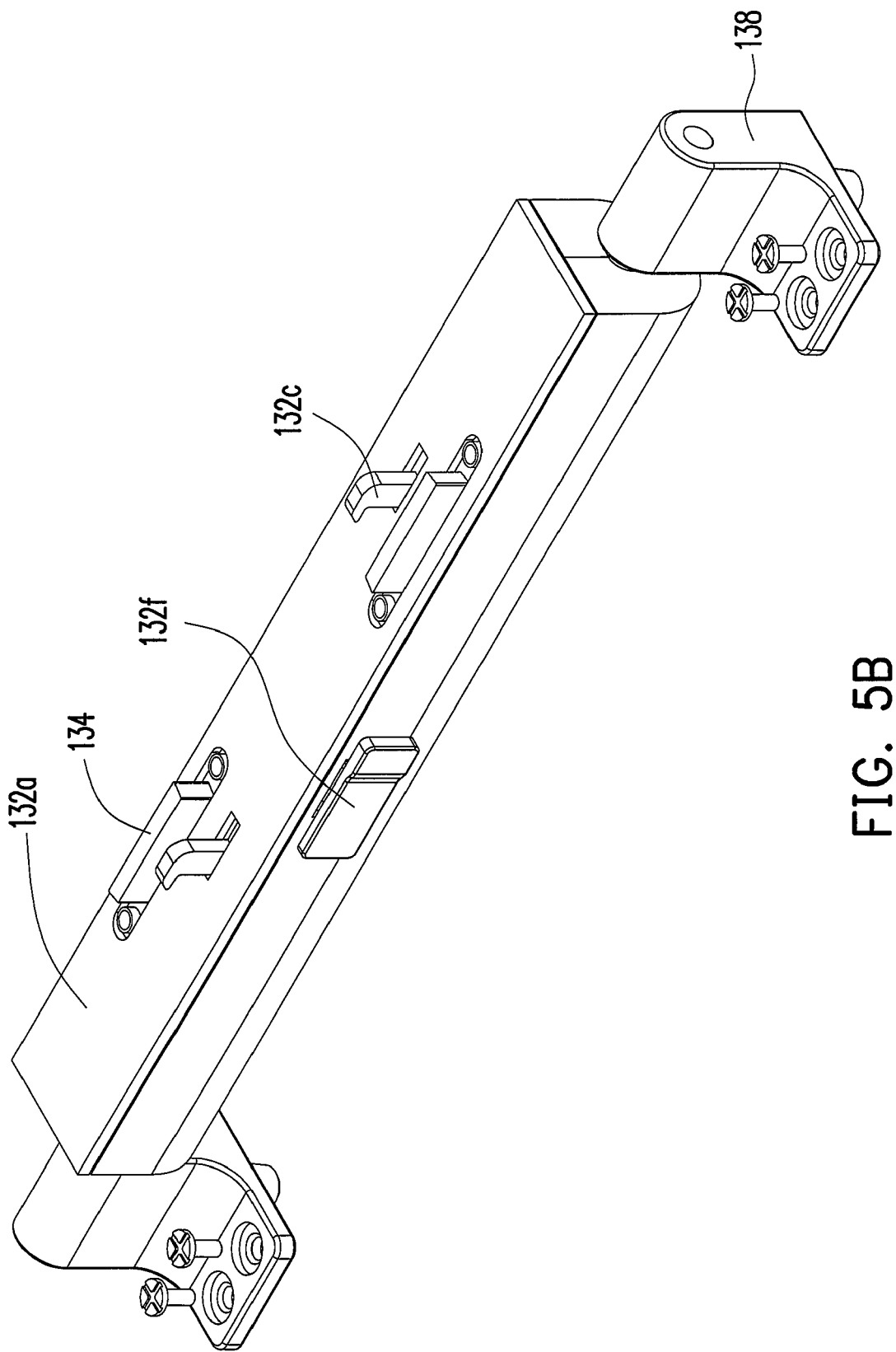
FIG. 5B is an assembled view of the part of connection assembly of FIG. 5A.

FIG. 5A is an exploded view of a part of the connection assembly disposed on the first body, and FIG. 5B is an assembled view of the part of connection assembly of FIG. 5A. Referring to FIGS. 5A and 5B, the connection assembly 130 of the portable electronic apparatus 100 further includes two hinges 138 disposed between the positioning unit 132 and the first body 110 (referring to FIG. 2A), such that the positioning unit 132 is rotatably connected to the first body 110 through the hinges 138.

Moreover, the positioning unit 132 includes a frame 132a, a latch 132b, a first buckling portion 132c, and a second buckling portion 132d (shown in FIG. 2A). The frame 132a is rotatably connected to the first body 110 through the hinges 138, and the latch 132b is movably disposed in the frame 132a. The first buckling portion 132c is connected to the latch 132b, and the second buckling portion 132d is connected to the second body 120 (shown in FIG. 2A).

The first buckling portion 132c is, for example, a hook (as shown in FIGS. 5A and 5B), and the second buckling portion 132d is, for example, a slot (shown in FIG. 2A). However, the present invention is not limited to such an arrangement, in another embodiment not shown, the first buckling portion 132c also can be a slot, and the second buckling portion 132d also can be a hook.

When the latch 132b is located at a first position relative to the frame 132a, the second buckling portion 132d and the first buckling portion 132c are buckled with each other, such that the second body 120 is connected to the first body 110 through the connection assembly 130, and they are separated by an external force. When the latch 132b is located at a second position relative to the frame 132a, the second buckling portion 132d and the first buckling portion 132c are not buckled with each other, such that the user can separate the second body 120 from the first body 110.

Moreover, the positioning unit 132 further includes a recovering component 132e (e.g., a spring) disposed between the latch 132b and the frame 132a, for exerting a force to drive the latch 132b to move to the first position relative to the frame 132a. Moreover, the latch 132b has a release key 132f, and the user can exert a force to the release key 132f to drive the latch 132b to move to the second position.

Therefore, when the user assembles the second body 120 with the first body 110, the second buckling portion 132*d* pushes the latch 132*b* to the second position through the first buckling portion 132*c*, and then, the recovering component 132*e* exerts a force to drive the latch 132*b* from the second position to the first position, such that the first buckling portion 132*c* is buckled with the second buckling portion 132*d*, so as to achieve the assembly of the second body 120 and the first body 110.

When the user wants to separate the second body 120 from the first body 110, he/she can pull the release key 132*f* to drive the latch 132*b* to move from the first position to the second position, such that the first buckling portion 132*c* and the second buckling portion 132*d* are not buckled with each other any more, and thus, the user can pull out the second body 120 from the first body 110.

The present invention further provides a base of a portable electronic apparatus, which includes the first body 110 and the connection assembly 130. The detailed structures and functions of the first body 110 and the connection assembly 130 have already been described above, which thus will not be described herein.

In view of the above, when the second body of the portable electronic apparatus is a tablet computer, since the connection assembly is adopted to replace the conventional rotatable disk mechanism, not only the convenience and versatility in usage are still remained, but also less surface area of the first body is occupied, and thus, the additional surface area of the first body can be used for disposing peripheral components, so as to reduce the limit on the peripheral design of the docking station for the conventional tablet computer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A connection assembly, adapted for connecting a first body and a second body of a portable electronic apparatus, comprising:
    a positioning unit, rotatably connected to the first body, and removably connected to the second body, the positioning unit comprising:
        a frame, rotatably connected to the first body;
        a latch, movably disposed in the frame;
        two first buckling portions, connected to the latch; and
        two second buckling portions, connected to the second body, wherein when the latch is located at a first position relative to the frame, the first buckling portions are respectively buckled with the second buckling portions, and when the latch is located at a second position relative to the frame, the first buckling portions are not respectively buckled with the second buckling portions;
    two first electrical connectors, connected to the positioning unit, wherein the two first electrical connectors are arranged in a first reference straight line, the two first buckling portions are arranged in a second reference straight line, and the first reference straight line and the second reference straight line intersect at a position between the two first electrical connectors and between the two first buckling portions; and
    a second electrical connector, connected to the second body, so as to connect to one of the first electrical connectors.

2. The connection assembly as claimed in claim 1, further comprising a hinge, disposed between the positioning unit and the first body, such that the positioning unit is rotatably connected to the first body through the hinge.

3. The connection assembly as claimed in claim 1, wherein the positioning unit is rotatably connected to one side of the first body, and removably connected to one side of the second body.

4. The connection assembly as claimed in claim 1, wherein one of the first buckling portion and the second buckling portion is a hook, and the other is a slot.

5. The connection assembly as claimed in claim 1, wherein the positioning unit further comprises:
    a recovering component, disposed between the latch and the frame, for exerting a force to drive the latch to move to the first position relative to the frame.

6. The connection assembly as claimed in claim 1, wherein the latch has a release key that is forced to drive the latch to move to the second position.

7. A base of a portable electronic apparatus, comprising:
    a first body; and
    a connection assembly, comprising:
        a positioning unit, rotatably connected to the first body, and removably connected to a second body of the portable electronic apparatus, the positioning unit comprising:
            a frame, rotatably connected to the first body;
            a latch, movably disposed in the frame;
            two first buckling portions, connected to the latch; and
            two second buckling portions, connected to the second body, wherein when the latch is located at a first position relative to the frame, the first buckling portions are respectively buckled with the second buckling portions, and when the latch is located at a second position relative to the frame, the first buckling portions are not respectively buckled with the second buckling portions;
        two first electrical connectors, connected to the positioning unit, wherein the two first electrical connectors are arranged in a first reference straight line, the two first buckling portions are arranged in a second reference straight line, and the first reference straight line and the second reference straight line intersect at a position between the two first electrical connectors and between the two first buckling portions; and
        a second electrical connector, connected to the second body, so as to connect to one of the first electrical connectors.

8. The base as claimed in claim 7, wherein the connection assembly further comprises a hinge disposed between the positioning unit and the first body, such that the positioning unit is rotatably connected to the first body through the hinge.

9. The base as claimed in claim 7, wherein the positioning unit is rotatably connected to one side of the first body, and removably connected to one side of the second body.

10. The base as claimed in claim 7, wherein one of the first buckling portion and the second buckling portion is a hook, and the other is a slot.

11. The base as claimed in claim 7, wherein the positioning unit further comprises:
    a recovering component, disposed between the latch and the frame, for exerting a force to drive the latch to move to the second position relative to the frame.

12. The base as claimed in claim 7, wherein the latch has a release key that is forced to drive the latch to move to the second position.

13. The base as claimed in claim 7, wherein the first body is a computer docking station or a computer system base.

14. A portable electronic apparatus, comprising:
a first body;
a second body; and
a connection assembly, comprising:
- a positioning unit, rotatably connected to the first body, and removably connected to the second body, the positioning unit comprising:
  - a frame, rotatably connected to the first body;
  - a latch, movably disposed in the frame;
  - two first buckling portions, connected to the latch; and
  - two second buckling portions, connected to the second body, wherein when the latch is located at a first position relative to the frame, the first buckling portions are respectively buckled with the second buckling portions, and when the latch is located at a second position relative to the frame, the first buckling portions are not respectively buckled with the second buckling portions;
- two first electrical connectors, connected to the positioning unit, wherein the two first electrical connectors are arranged in a first reference straight line, the two first buckling portions are arranged in a second reference straight line, and the first reference straight line and the second reference straight line intersect at a position between the two first electrical connectors and between the two first buckling portions; and
- a second electrical connector, connected to the second body, when the second body is connected to the position unit in a first connection state, the second electronic connector is connected to one of the first electrical connectors, and when the second body is connected to the position unit in a second connection state opposite to the first connection state, the second electrical connector is connected to the other one of the first electrical connectors.

15. The portable electronic apparatus as claimed in claim 14, wherein the connection assembly further comprises a hinge disposed between the positioning unit and the first body, such that the positioning unit is rotatably connected to the first body through the hinge.

16. The portable electronic apparatus as claimed in claim 14, wherein the positioning unit is rotatably connected to one side of the first body, and removably connected to one side of the second body.

17. The portable electronic apparatus as claimed in claim 14, wherein one of the first buckling portion and the second buckling portion is a hook, and the other is a slot.

18. The portable electronic apparatus as claimed in claim 14, wherein the positioning unit further comprises:
a recovering component, disposed between the latch and the frame, for exerting a force to drive the latch to move to the first position relative to the frame.

19. The portable electronic apparatus as claimed in claim 14, wherein the latch has a release key that is forced to drive the latch to move to the second position.

20. The portable electronic apparatus as claimed in claim 14, wherein the first body is a computer docking station, and the second body is a tablet computer.

21. The portable electronic apparatus as claimed in claim 14, wherein the first body is a computer system base, and the second body is a display.

* * * * *